March 14, 1950 C. S. ACKLEY 2,500,305
ELECTRIC OIL WELL HEATER
Filed May 28, 1946 3 Sheets-Sheet 1

INVENTOR.
CHARLES S. ACKLEY
BY Henry J. Lucke
ATTORNEY

March 14, 1950 C. S. ACKLEY 2,500,305
ELECTRIC OIL WELL HEATER
Filed May 28, 1946 3 Sheets-Sheet 2
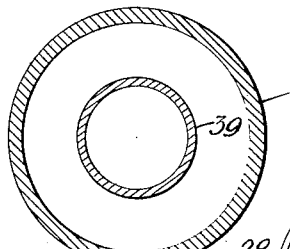
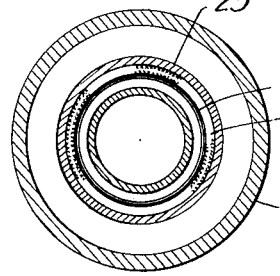
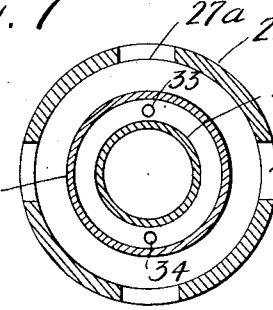
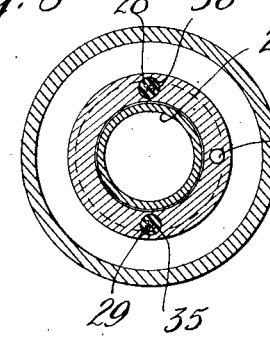
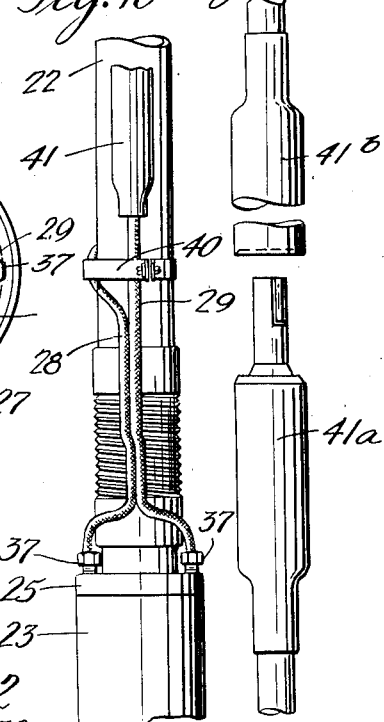
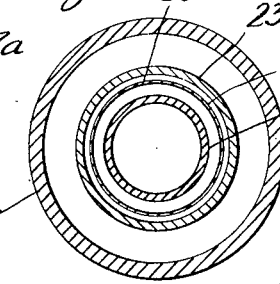
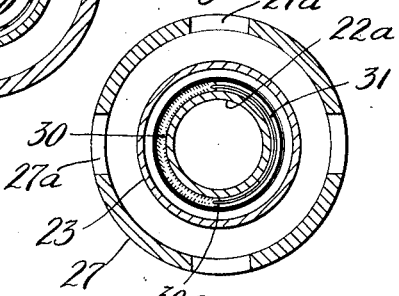
INVENTOR.
CHARLES S. ACKLEY
BY Henry J. Lueke
ATTORNEY March 14, 1950 C. S. ACKLEY 2,500,305
ELECTRIC OIL WELL HEATER
Filed May 28, 1946 3 Sheets-Sheet 3
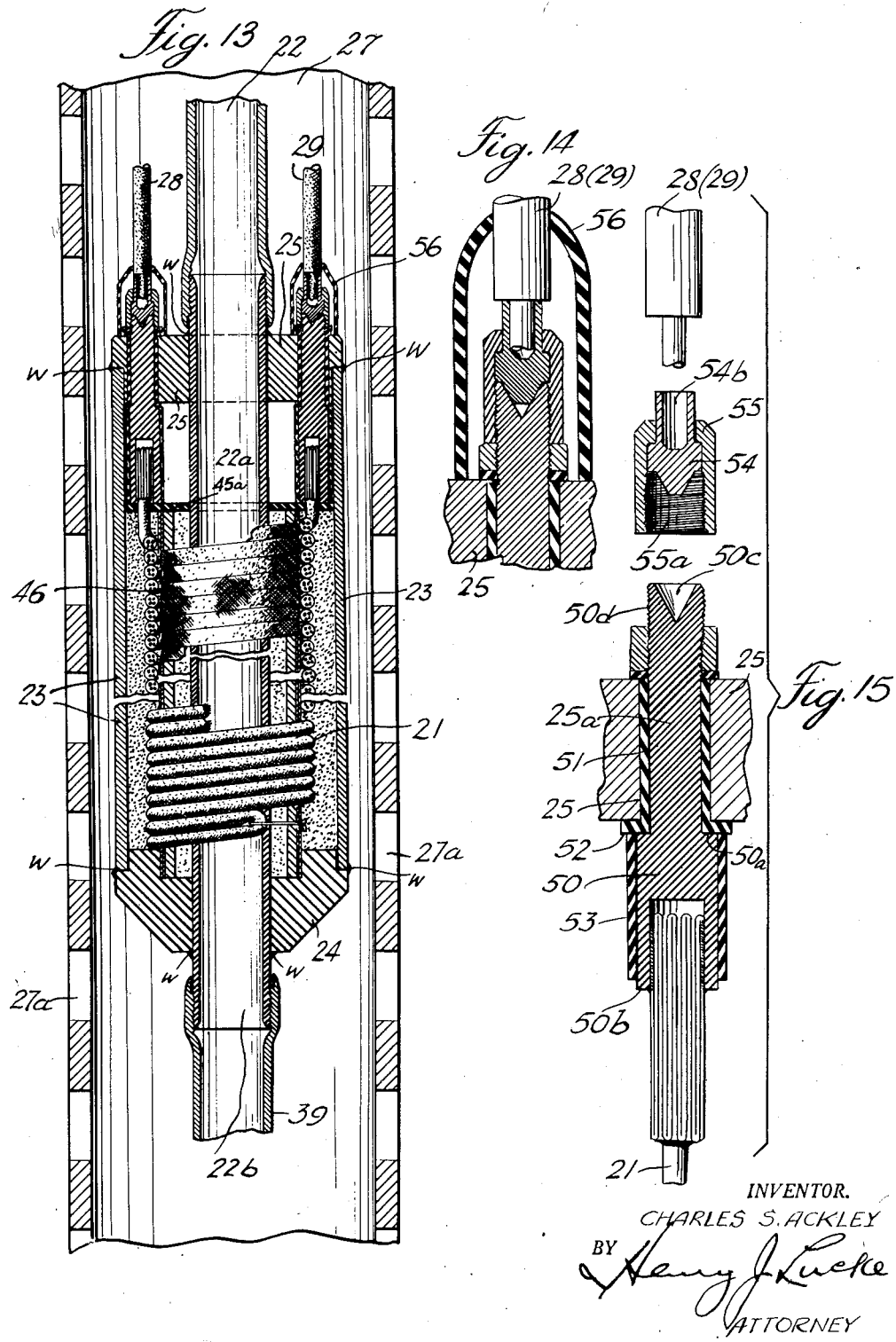
INVENTOR.
CHARLES S. ACKLEY
BY Henry J. Lucke
ATTORNEY Patented Mar. 14, 1950

2,500,305

UNITED STATES PATENT OFFICE 2,500,305

ELECTRIC OIL WELL HEATER

Charles S. Ackley, New York, N. Y., assignor to Thermactor Corporation, New York, N. Y., a corporation of Delaware Application May 28, 1946, Serial No. 672,897

1 Claim. (Cl. 219—33)

The invention relates to heat treatment of sub-surface materials.

Pursuant to the invention, sub-surface materials are subjected to elevated temperature by the employment of electrical heating means suspended within a suitable opening in the earth leading to the sub-surface materials to be treated. Desirably, such opening is encased by a casing, a perforated portion thereof being provided adjacent the zone of the sub-surface material to be treated, whereby to enhance the efficiency of the heat treatment afforded by the electrical heating means.

Such heating means is preferably enclosed in a self-sealed housing, to render the same proof against entry of oil, water or moisture and other foreign deterrent materials encountered in carrying out the purposes of the invention.

Advantageously, such heat treating means is mounted on a tube suspendedly extending from the earth's surface. Conveniently such tube is formed of a series of tube sections, the heating means being carried by a section of such tube, such section of the tube forming an inner annular wall of the self-sealed housing. The suspension means of the tube permits selective locating of the heating means in operative adjacency with respect to the sub-surface material to be treated.

The invention is practiced in connection with the freeing of oil wells clogged by heavy constituents, such as paraffin composition of natural oil, clogged gas wells, and the like, suitable pumping means being associated with my electrical heating means and coordinated with such tube leading to the earth's surface whereby upon the generation of heat emitted by my heating means such solid clogging constituents are rendered fluid, thus restoring the delivery of the well.

My combined heating unit and tube may similarly be employed for opening-up the flow of oil from oil-bearing sub-strata of the earth.

My heating means mounted upon and in combination with such tube may also be employed for increasing the output of oil wells where the crude oil is of relatively high viscosity, my heating means serving to increase the fluidity of such nature of crude oil.

In carrying out my invention, two or more heating units may be incorporated in the tube at successive levels, to selectively emit heat energy at such successive locations.

Pursuant to the invention, such tube may be employed to deliver under pressure, air, water or other suitable fluid medium, whereby such fluid medium is heated in its passage through the tube and thus conveys to the sub-surface material to be treated additional heating energy supplied by such fluid medium in the freeing of clogged oil wells and in the opening-up of the flow of oily constituents from oil-bearing sub-strata.

Suitable provision is made for sealing the electrical leads of the electrical heating means for connection with a suitable source of electrical energy disposed at or adjacent the earth's surface, and means are provided for affording protection of the electrical parts at the stages of insertion of the heating means into the earth and of the assembly thereof with the associated tubular means.

My invention is applicable generally for heat treating sub-surface materials by conveyance of heat energy through the instrumentality of the water, air or other suitable medium which is fluid or rendered fluid by the electrical heating means. Pressure is applied to such fluid material whereby the sub-surface material is dually heat-treated and subjected to pressure conveyed through the heated pressure-supplied medium.

Applications of the invention reside also in the fields of heat treatment of sub-surface materials where it is advantageous to introduce material into the geological structure for the purposes of initiating tapping of deposits of crude oil, gas formations, and the like.

The present invention is also applicable for preliminarily elevating the temperature of sub-surface materials by thermal radiation and/or by thermal conduction directly with respect to the sub-surface material, and the subsequent treatment by the flow of water, air or other suitable fluid supplied under pressure through the tube supporting my electrical heating means.

The sealing of the housing of the electrical heating means is carried out to insure the absence of any undue pressure of the air within the housing at the range of maximum operating temperature, as well as the total expulsion of moisture of the originally contained and occluded air within the materials of the component parts enclosed within the housing. Condensation of such moisture is thereby obviated, together with consequent impairment of the efficiency of the electrical heating unit.

Further features and objects of the invention will be more fully understood from the following detailed description and the accompanying drawings, in which:

Fig. 4 is a transverse sectional view on line 4—4 of Fig. 1.

Fig. 5 is a detail transverse sectional view on line 5—5 of Fig. 1.

Fig. 6 is a detail transverse sectional view on line 6—6 of Fig. 1.

Fig. 7 is a detail transverse sectional view on line 7—7 of Fig. 1.

Fig. 8 is a detail transverse sectional view on line 8—8 of Fig. 1.

Fig. 9 is a detail transverse sectional view on line 9—9 of Fig. 1.

Fig. 10 is a detail side elevation of the apparatus showing one manner of arranging of the electrical cables, extending exteriorly of and supported by the tube, leading to the earth's surface, for affording protection of the electrical cables.

Fig. 11 is a detail exploded elevational view of the component parts of a preferred type of coupling for each electrical cable for connection with the respective terminals of the electrical conductors of the heating unit.

Fig. 12 is a transverse sectional view on line 12—12 of Fig. 2.

Fig. 13 is a vertical central sectional view of another embodiment of the electrical heating means, its coordinated tube and pumping equipment, and perforated casing, pursuant to the invention.

Fig. 14 is a detail vertical section of a sealed type of electrical cable connection.

Fig. 15 is an exploded view, in vertical central section of the electrical cable connection shown in Fig. 14.

Figures 1, 2, 3:
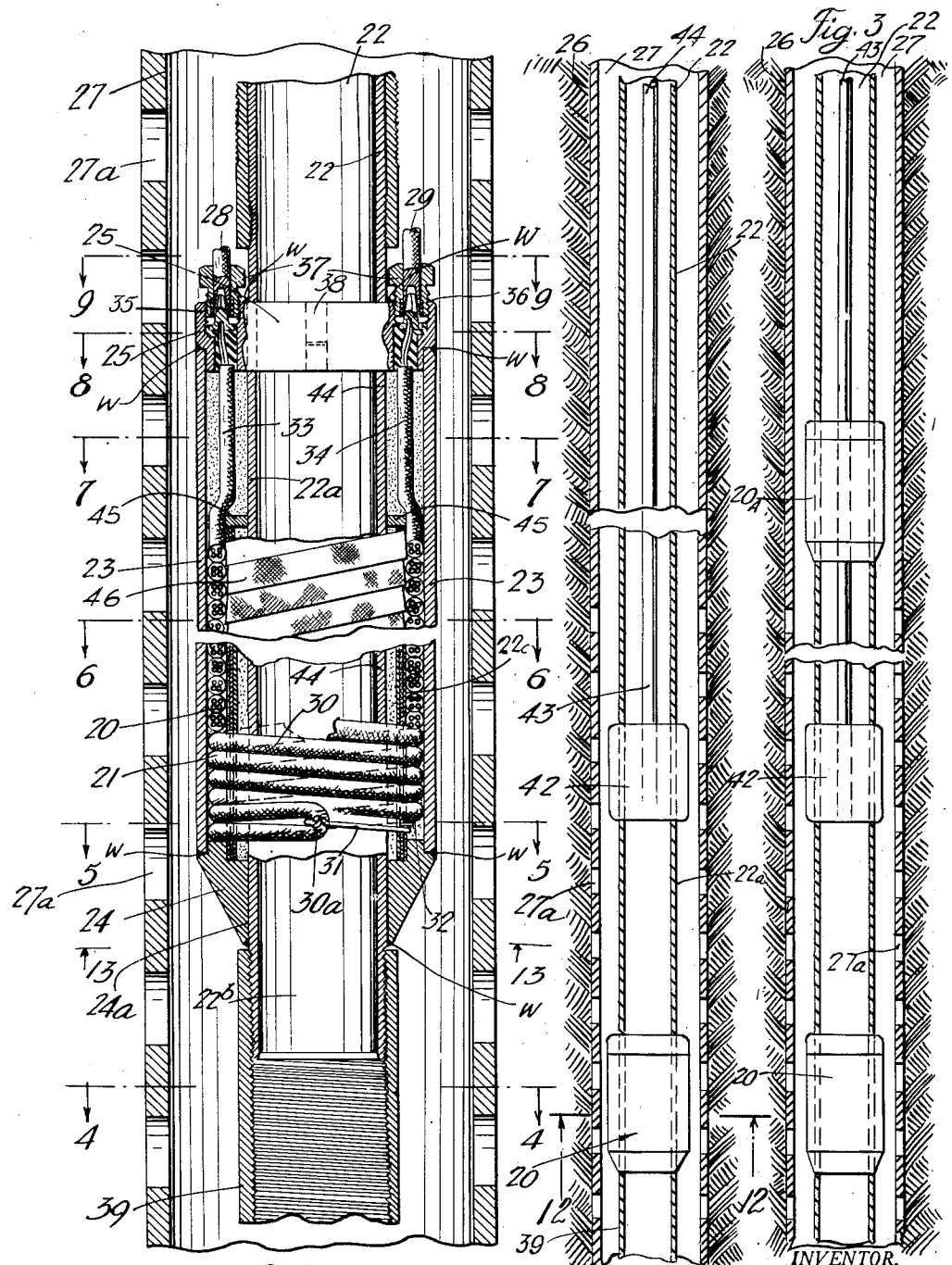
Fig. 1 is a vertical central sectional view of a preferred assembly of the electrical heating means sealingly supported upon a suitable inner tube and exteriorly self-sealed within outer tubular means pursuant to my present invention, such assembly being shown selectively located within a well casing having perforated walls.
Fig. 2 is a vertical central, sectional, diagrammatic view illustrating the employment of the assembly of a single electrical heater unit and associated inner and outer tubular means in conjunction with a perforated casing, combined with pumping equipment, pursuant to the invention.
Fig. 3 is a diagrammatic view similar to that of Fig. 2 indicating the employment of a set of two electrical heating units and associated inner and outer tubular means in conjunction with a perforated casing, combined with pumping equipment.

Referring to the drawings which illustrate preferred embodiments of the invention, and in particular Figs. 1 and 4 through 12, 20 indicates generally the electrical heating unit. The unit comprises a suitable electrical coil 21, suitably sealingly supported and suitably electrically insulated with respect to the section 22a of the tube 22. Conveniently, as indicated, such tube 22, which leads to the earth's surface, is formed of a series of tube sections suitably sealingly secured to one another as by mating threading. The electrical coils 21 are suitably insulated, as shown, wound upon the inner sleeve 22c serving in the manner of a mandrel, and sealingly enclosed within the sleeve 23, referred to more fully hereinafter. Accordingly there is provided a housing for the electrical coils which is sealed outwardly and inwardly against entry of water, oil, moisture, etc., in protection and maintenance of performance of the electrical coil.

As one arrangement for affording such seal-proof housing, the lower end portion of the sleeve 23 is secured to and sealed with respect to the embraced tube section by the foot member 24, having a central opening indicated at 24a. The inner face of the foot 24 is welded onto the outer face of the lower tube section 22b. The upper end of the seal-proof housing is closed by a head 25, see Figs. 1 and 8. The head 25 is shown in the form of an annulus sealingly secured at its inner periphery with respect to the embraced tube section 22a and similarly with respect to the upper edge of the outer sleeve 23 of the housing. Such assembly and sealed securement is set forth more fully hereinafter.

The tube 22 is suitably connected at the earth's surface with a source of pressure fluid supply, such as air, water or other media which is either normally in fluid status or rendered fluid by the electrical heating unit.

The assembly of the heating unit including its enclosing housing and complete tube 22 are suspended as a unit within the opening in the earth which is encased in a suitable casing, as of steel. As shown in Figs. 2 and 3, such opening in the earth is indicated at 26 and the casing 27. Desirably, the portion of the casing 27 adjacent the zone of treatment of the sub-surface material is provided with perforations indicated at 27a, to thereby enhance effect upon the sub-surface strata of the heat energy emitted by the heating unit.

The heating unit 20 is energized by a suitable electrical supply connected to the terminals of the conductors of electrical coils, as through the cables 28, 29. These cables are carried by the tube 22, are protected against water, oil, moisture and the like, and are insulated against undue exterior heat.

Specifically, the heating unit illustrated in Fig. 1 comprises a series of helically wound electrical coils 30. Preferably, the coils are wound to preclude, i. e. counteract, the generation of magnetic flux, as by forming a loop 30a, see Fig. 1, at one-half of the length of the electrical wiring. The loop 30a is anchored as by means of a glass fibre cord 31 which is secured at one end, as to a stud 32 fixed in the mandrel 22c. The electrical wiring is helically wound in double convolutions, its two terminals 33, 34 extending through diametrically spaced holes in an annulus 45 of insulating material disposed transversely inside of the electrical heating unit. Thence the terminals 33 and 34 are brought through suitable sealed openings 35, 36 in the head 25. The bared ends of the terminals 33, 34 are connected by insulating nuts 37, 37 with the respective cables 28, 29, which extend to a suitable electrical controlling device (not shown) which may automatically or manually regulate the current supply to maintain a desired temperature in the heating device. Such controlling device preferably receives its energy from a commercial type electrical transformer, which isolates this system electrically from the general distribution system.

The sealing of the housing of the heating unit inwardly and in permanent relation with respect to the tube 22, and outwardly is carried out as follows. The foot member 24 is first welded to the lower end of the inner tube section 22a and to the lower end of the outer sleeve 23. Then, the performance and stabilization of position of the electrical coil are checked. Following such test, the head 25 is then welded at its inward periphery to the upper end of the tube section 22a and also at its outward periphery with the upper end of the outward sleeve 23. The locations of peripheral welds are indicated in Fig. 1 by W. Upon completing such welding operations, suitable comminuted electrical insulation is charged within the housing to fill the voids and clearances between the convolutions of the electrical coil and otherwise between the inner and outer walls of the housing. Obviously, the function of the comminuted insulation is that of electrical insulation only, since the function of the heater is to transmit heat beyond its walls. Accordingly, the selected comminuted material is such as to provide electrical insulation substantially without heat insulation. The charging of such electrical insulating material may be carried out by drilling an opening, see 38 Fig. 8, through the head 25 through which such comminuted insulating material is poured. At the same time the housing may be tapped to insure stable settlement of the comminuted insulating material within the voids and other spaces within the housing. Upon completing such operation, the opening 38 is sealingly closed, as by means of a plug secured by welding. The cables 28, 29, and their connections and mechanical engagements are preferably insulated with mica composition.

Upon completing the above preliminary steps, the electrical current is again applied to the electrical heating coil 30 for the maximum range of heat emission, during a period to insure that the entirety of the housing and its contents are brought to maximum heat, including the elevation of the temperature of the therein contained air. Upon attaining such status, a plug is placed in and welded in position in the opening 38, thus sealing the interior of the housing and the therein contained parts. This procedure is carried out for the purpose of obviating later any undue pressure upon the component parts of the housing due to pressure of the contained air at the maximum heat of the electrical coils in actual performance pursuant to the invention over a sustained period. Thus maintenance of sealing of the housing is insured, including expulsion of all moisture.

Succeeding such procedure, the lower end 22b of the tube section 22a is connected, as by screw threading, with a tube section 39 which is of suitable length for carrying out the purposes of the invention. The upper end of the tube section 22a is similarly connected to the next above tube section, and such additional upper tube sections are connected, pursuant to current practice, to provide the required length of tube extending from the earth's surface to the zone of the sub-surface material to be treated.

The electrical cables 28, 29 are carried by the tube 22 through suitable connection therewith. As indicated in Fig. 10, such cables 28, 29 are secured to the exterior of the tube 22 as by means of straps 40, one of which is illustrated in Fig. 10. Such strap is desirably a band of stretchless rubberized canvas, closed by a cam type of lock. All electrical connections of the cables 28, 29 are made proof against water, oil, moisture, and the like, in accord with the conditions of operation, as will be understood by those skilled in the art.

A desirable form of electrical connection for the electrical cables is indicated in Figs. 10 and 11, designated generally 41, and consisting of two parts, 41a and 41b. The former has a male connection with the socket end of the latter, the joint being secured mechanically and sealed with a suitable electrical sealing compound which is proof against water, oil, moisture, and the like.

Assuming the installation of a casing 27 of suitable length and the suspension therein of the pipe 22 to locate the heating unit 20 in operative adjacency with respect to the zone of the sub-surface material to be treated, the electrical unit 20 is energized to radiate and otherwise emit heat energy to thereby attain the desired elevated to-be-treated sub-surface material. By reason of the hermetically sealed housing of the electrical heating unit 20, entry of oil, water or moisture, or other foreign material, inclusive of exterior air, is excluded. Further, by reason of the small amount of air internally captured within the hermetically sealed housing, the walls of the housing are free from undue pressure arising by reason of the electrical coils being operated at maximum normal temperature. Also, by reason of the electrical coils being wound upon themselves, inductive currents are prevented from occurring in the housing. This makes possible the use of steel or other ferrous material for the walls of the housing without production of heat due to inductive electrical currents. Thus the temperature of heat treatment within the zone of the to-be-treated sub-surface strata is controlled positively by control of the electrical current supplied to the electrical coil. Unduly high temperature capable of causing explosion or ignition of petroleum laden mixtures within the earth's openings is thus avoided.

The electrical heating pursuant to the invention may be employed in combination with the tube 22 for the supply through the tube at its opening near the earth's surface of air, water, or the like, for the purpose of heating such fluid medium in its passage through the tube. The zone of the electrical heating unit may thus serve for delivery of the thus supplied heat energy to the zone of the to-be-treated sub-surface material. Air, water or the like may accordingly be discharged through the lower opening of the tube, thence into the sump of the well and thus into and through the oil bearing strata.

In the instance where an oil well has become dormant by clogging solidified constituents such as heavy paraffins and the like, such fluid medium functions to supply heat energy and thus liquify such clogging substances and also to exert positive pressure to dislodge such clogging constituents. Upon clearing such clogging constituents, the thus supplied air, water, or the like is then pumped out of the well through the tube 22 by means of the pumping equipment, and thus eventually the liquified, previously clogging substances.

Such procedure of treatment of sub-surface material is diagrammatically illustrated in Figs. 2 and 3 of the drawings. In Fig. 2, a single electrical heating unit is indicated at 20, the working valve component of the pumping equipment indicated at 42 and the sucker rod at 43. In such operation, the casing 27 of the oil well is preferably provided with perforations indicated at 27a, particularly adjacent the zone of the to-be-treated sub-surface materials. Such perforations afford passage for heated fluid into and out of the casing 27.

Pursuant to the procedure illustrated in Fig. 3, utilizing two electrical heating units, indicated respectively at 20 and 20A, the working valve component of the pumping equipment, indicated at 42, may be coupled in the tube 22 intermediate the locations of such heating units 20, 20A. The upper electrical heating unit 20A serves to supply heat energy to the pressure supplied heating medium supplemental to that of the electrical heating unit 20, at the stated preliminary stage, and also at the stated supplemental stage of withdrawal of the natural oil and accompanying fluids serving to supply heat energy thereto in its transit upwardly of the oil withdrawing tube 22.

If preferred, any number of additional heating units may be installed in combination with the tube 22 at such stages and at such mutual spacing for the supply of heat energy at the respective preliminary and subsequent stages above referred to.

The embodiment of the electrical heating unit illustrated in Fig. 13 conforms generally to that of Figs. 1, 4 through 12, and like parts are designated by like reference characters. The embodiment illustrated in Fig. 13 particularizes the employment of an annulus of asbestos indicated at 45a of larger outer diameter, serving as an upper enclosing element for the full area of the annular space in which the insulating granular material is enclosed. The embodiment shown in Fig. 13, and also in detail in Figs. 14 and 15, embodies another form of connection of the electrical cables with the terminals of the electrical coil 21. It also provides a hermetic seal of such connections with respect to the interior of the housing of the electrical coil. In particular, each such electrical connection includes a member 50, preferably of phosphor bronze, which passes through a perforation 25a in the upper metal head 25, a bushing 51, say of liquid and moisture resisting compacted mica immediately surrounding the body portion of the member 50 and insulating the same with respect to the metal head 25. The connection also includes a washer 52 of like liquid and moisture resisting compacted mica interposed between the shouldered portion 50a of such member 50 and the lower face of the head 25. At the lower end of the member 50, a recess indicated at 50b is provided into which is frictionally inserted under pressure a compacted group of metallic strands with which connection is afforded with a terminal of the electrical coil 21.

The outer face of the lower body portion of the conducting member 50 is electrically insulated by a sleeve 53, which may also be of compacted mica.

At the upper end 50c of such member 50 a conical recess is formed into which is forced under pressure the element 54, also preferably of phosphor bronze and having a lower end of corresponding conical formation. The upper portion of such member 54 is hollow and of cylindrical formation and is provided exteriorly with threading with which mates the threading of the upper opening of the hollow member 55. The inner face of the enlarged lower opening of the member 55 is provided with threading as indicated at 55a meshing with the external threading 50d at the upper end portion of the member 50. Into the hollow opening 54b of the element 54 is frictionally inserted the bared conductor of the insulated cable 28, or 29, such cylindrical projection being preferably soldered in position. The solder which is used is to maintain solidity at temperatures well above the maximum temperature of heating attained in the operation of the heating coil. A hood 56, of plastic, or like insulating material encloses the lower portion of the insulation of each cable 28, 29.

The wiring of the electrical heating coil is preferably of high resistance, and is preferably sheathed in fiber glass tape, indicated at 46. Suitable means are provided for controlling the electrical current and thereby regulating the degree of heat energy radiated and/or emitted by the electrical heating means.

Conventional derricks and reels and appurtenant equipment may be employed for suspending the tube 22 and regulating the extent of insertion of the tube. Thus it is possible to locate the one or more heating units in proper adjacency with respect to the sub-surface material to be treated. It is also possible to provide the piping and connections at the earth's surface leading from the upper end of the tube 22 with a suitable reservoir for the delivery therein of the oil from the recovered oil well or from the freshly opened oil-bearing sub-surface material. In the instance of the employment of a pressure fluid medium, suitable equipment is employed for connection with the source of the pressure fluid medium.

From the above, it is apparent that my invention provides for the heating within the oil well in the vicinity of the sump, by electrical heating means. The apparatus is arranged and constructed to afford nicety of control of the nature and degree of heat energy emitted by the electrical heating means in such vicinity and of the pressure fluid supplied through the tube. Such control makes it possible to prevent the generation of any temperature capable of causing explosion or other undue disturbance within the oil well of the gaseous constituents of the petroliferous material of the treated sub-surface zones and also of any explodable gases engendered by the heating of the petroliferous material. Furthermore, the organization of the essential parts of my invention assures long life and continued high efficiency of operation of the electrical heating means. The residue of air contained within the housing of the electrical heating means is of such reduced pressure that undue internal pressure of the air incident to operation of the electrical coil at maximum temperature for continued long runs of operation as may be necessary, is obviated. Furthermore, condensation of water or other deleterious liquid constituents originally occluded in the component parts within the housing of the electrical heating means is precluded.

I claim:

An electrical resistance heater for use with means for treating sub-surface material including a tubular member extending from the earth's surface to the zone of sub-surface material to be treated, said heater comprising: a section of the tubular member; a sleeve surrounding said section substantially coaxially therewith; a foot member sealing the lower end of said sleeve with respect to said section; and a head sealing the upper end of said sleeve with respect to said section; said foot member and said head connecting said sleeve as an integral part of said section; in combination with electrical wiring wound about said section in the space between said section and said sleeve, spaced from both; said electrical wiring being wound in reverse convolutions to preclude the operation of magnetic flux; comminuted electrical insulation in the space between said section and said sleeve and in contact with said section, said sleeve, and said electrical wiring for electrically insulating the windings of said wiring from one another, from said section and from said sleeve substantially without heat insulation; said comminuted electrical insulation providing a heat conducting path to both said tubular section and said sleeve; said wiring having terminals extending outside of said head; and electrical conductors connected to the terminals of said electrical wiring and extending outside of the tubular member to a source of electrical energy; whereby energization of said electrical wiring heats both said section and said sleeve to provide heat energy within said section and beyond said sleeve.

CHARLES S. ACKLEY.

REFERENCES CITED

The following references are of record in the file of this patent:

UNITED STATES PATENTS

| Number | Name | Date |
|---|---|---|
| 495,936 | Gardner | Apr. 18, 1893 |
| 573,142 | Flanegin | Dec. 15, 1896 |
| 806,039 | Williamson et al. | Nov. 28, 1905 |
| 1,174,570 | Halbleib | Mar. 7, 1916 |
| 1,232,736 | Truman et al. | July 10, 1917 |
| 1,309,721 | Drinkern | July 15, 1919 |
| 1,426,407 | Pennington | Aug. 22, 1922 |
| 1,504,208 | Brine | Aug. 12, 1924 |
| 2,134,610 | Hogg | Oct. 25, 1938 |